US009908693B1

(12) United States Patent
Lawyer

(10) Patent No.: US 9,908,693 B1
(45) Date of Patent: Mar. 6, 2018

(54) RIGID TRASH RECEPTACLE WITH RETRACTABLE STRAP

(71) Applicant: Jamshed Erich Lawyer, Knivsta (SE)

(72) Inventor: Jamshed Erich Lawyer, Knivsta (SE)

(73) Assignee: Jamshed Erich Lawyer, Knivsta (SE)

( * ) Notice: Subject to any disclaimer, the term of this patent is extended or adjusted under 35 U.S.C. 154(b) by 0 days.

(21) Appl. No.: 15/252,249

(22) Filed: Aug. 31, 2016

(51) Int. Cl.

| | |
|---|---|
| ***B65F 1/00*** | (2006.01) |
| ***B65F 1/06*** | (2006.01) |
| ***B65D 25/28*** | (2006.01) |
| ***B65D 21/02*** | (2006.01) |
| ***B65F 1/14*** | (2006.01) |
| ***B62B 1/00*** | (2006.01) |

(52) U.S. Cl.
CPC ................ *B65F 1/06* (2013.01); *B62B 1/006* (2013.01); *B65D 21/0209* (2013.01); *B65D 25/2808* (2013.01); *B65F 1/1473* (2013.01)

(58) Field of Classification Search
CPC .. B65F 1/06; B65F 1/1473; B65F 1/00; B65F 1/04; B65F 1/14; B65F 1/141; B65F 1/1415; B65B 67/12; B65B 67/1233
See application file for complete search history.

(56) References Cited

U.S. PATENT DOCUMENTS

| | | | | |
|---|---|---|---|---|
| 3,927,445 A * | 12/1975 | Pavlish | B65F 1/06 | 24/30.5 L |
| 5,711,563 A * | 1/1998 | Sapp | B65F 1/1415 | 248/99 |
| 2002/0138954 A1* | 10/2002 | Territo | B65F 1/06 | 24/306 |
| 2014/0231435 A1* | 8/2014 | McCabe | B65F 1/06 | 220/495.08 |
| 2014/0346176 A1* | 11/2014 | O'Brien | B65F 1/06 | 220/495.11 |
| 2015/0158615 A1* | 6/2015 | Downs | B65B 67/1233 | 24/71 ST |

* cited by examiner

*Primary Examiner* — Brian L Swenson

(57) ABSTRACT

A rigid trash receptacle with retractable strap for receiving a trash can liner and securing it to the upper rim of a rigid trash receptacle in order to keep the trash can liner from falling into the rigid trash receptacle when it is being filled. Such a securing system includes a rigid trash receptacle with a protruding upper rim, a retractable strap and a rigid hook on the protruding end of a strap that is contained in a strap retractor mechanism which the strap can be spooled out of and retracted back into with the help of a torsion spring, and a pointed stake protruding from the outside of the rigid trash receptacle that is mounted close to the upper rim of the rigid trash receptacle enabling the retractable strap to wrap around the upper rim of the rigid trash receptacle and eventually be hooked onto the pointed stake pinning the open end of the trash can liner to the upper rim of the trash can.

15 Claims, 6 Drawing Sheets

RIGID TRASH RECEPTACLE WITH RETRACTABLE STRAP

BACKGROUND OF THE INVENTION

Trash can liners have been used within rigid trash receptacles to keep trash in a confined and easy to manage space for easy removal.

In the past suspending a trash can liner upright within a rigid trash receptacle has been problematic. The trash can liners are usually placed within a rigid trash receptacle and opened with the opening of the trash can liner being folded over the upper rim of the rigid trash receptacle. The trash can liner then stands within the rigid trash receptacle with nothing to hold it up. When it comes time to deposit trash into the trash can liner, the heavy trash forces the top of the trash can liner to separate from the protruding upper rim of the rigid trash receptacle and descend into the rigid trash receptacle folding over on itself and closing the opening to the trash can liner. This can cause some of the trash to fall outside the trash can liner causing articles to fall inside the rigid trash receptacle and outside of the trash can liner. Individuals would then reposition the trash can liner over the upper rim of the rigid trash receptacle and do this procedure again and again until the bag is full enough to support itself. Enabling engagement and then retraction of the suspension mechanism into a small confined area of the rigid trash receptacle enables the rigid trash receptacle to be stacked and easily transported.

The constant failure of the trash can liner to stay suspended in a rigid trash receptacle increases expenses, consumes time, reduces convenience and lowers the overall utility of the rigid trash receptacle. Currently there is no device available which simply and easily facilitates the engagement and retention of a trash can liner to the upper rim of a rigid trash receptacle while allowing for easy disengagement and unencumbered storage and transportation.

Elastic elements to suspend trash can liners to the upper rim of a rigid trash receptacle have been used for quite some time. The trash can liner is folded over the upper rim of the rigid trash receptacle and the stretchable elastic element is then pulled over the folded part of the trash can liner and the upper rim of the rigid trash receptacle thereby securing the trash can liner to the rigid trash receptacle. However, this device suffers from certain drawbacks. The biggest drawback is the fact that the stretchable elastic element is not secured to the rigid trash receptacle so it must be removed and put somewhere which can cause it to be misplaced and not available when it is needed. The stretchable elastic element can also be used for some type of other application which can also cause it to be misplaced. When this stretchable elastic element is somehow secured to the outside of a trash can there is the drawback of it protruding from the outside of the rigid trash receptacle limiting the ability of the rigid trash receptacle to be stacked so the rigid trash receptacle can be easily distributed and stored.

BRIEF SUMMARY OF THE INVENTION

Accordingly, the object of the present invention is to provide a novel securing system which overcomes the drawbacks discussed above. The device is designed to secure and suspend a trash can liner which is inserted into a rigid trash receptacle and subsequently used for the deposit of trash, so that the liner holds securely to the protruding upper rim of the rigid trash receptacle causing it to stay upright and not to descend into the rigid trash receptacle when being filled.

The device used to secure a trash can liner inside a rigid trash receptacle comprises: a new and improved rigid trash receptacle for receiving trash can liners with a fluted design which enables the rigid trash receptacle to be stacked with a limited loss of stacking room; a retractable strap that is contained inside a housing inside the rigid trash receptacle and is wrapped around the upper rim of the rigid trash receptacle after the trash can liner has been folded over the upper rim of the trash can; and a protruding pointed stake that is mounted close to the upper rim of the rigid trash receptacle enabling the retractable strap to change direction by 90 degrees enabling the retractable strap to wrap around the entire upper rim of the rigid trash receptacle and eventually be hooked onto the pointed stake pinning the trash can liner to the upper rim of the rigid trash receptacle.

These and other features, aspects and advantages of the present invention will become better understood with reference to the following drawings, description and claims.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The following detailed description is of the best currently contemplated modes of carrying out exemplary embodiments of the invention.

The present invention includes a trash can that securely holds a trash can liner. The present invention securely holds the trash can liner open along the entire protruding upper rim of the rigid trash receptacle with the use of a retractable strap that upon disengagement retracts back inside the rigid trash receptacle with the help of a torsion spring so this strap can never be lost or misplaced. Further, the present invention does not dramatically increase the bulk of the rigid trash receptacle.

Figure 1:
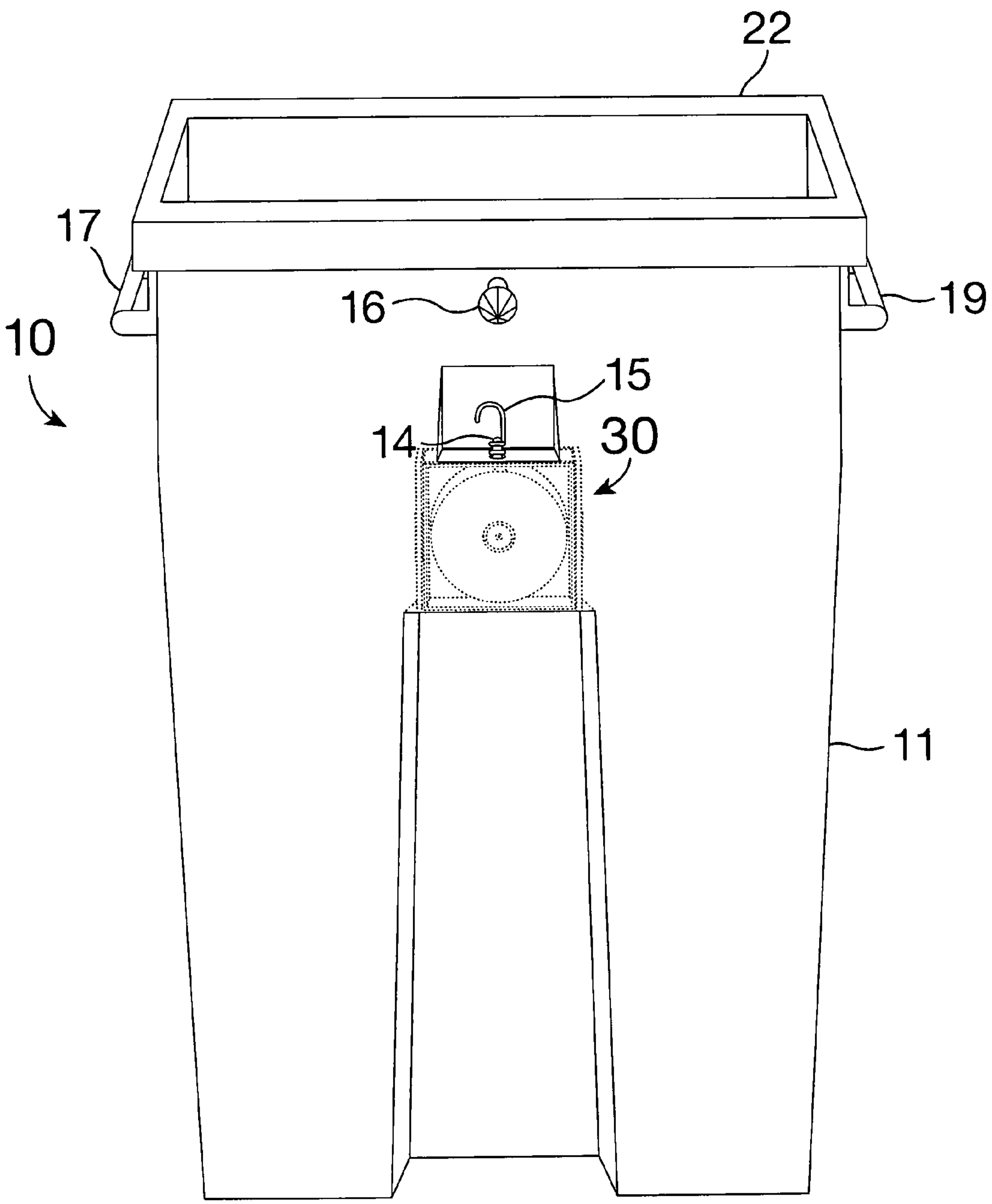
FIG. 1 is a perspective front view of a first embodiment of the rigid trash receptacle with retractable strap that is useful for understanding the inventive arrangements.
Figure 2A:
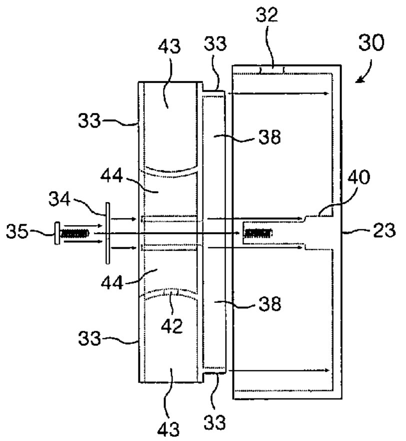
FIG. 2A is an exploded left side view of the strap retractor mechanism without the strap or the torsion spring shown showing how the respective parts of the strap retractor mechanism fit together.
Figure 2B:
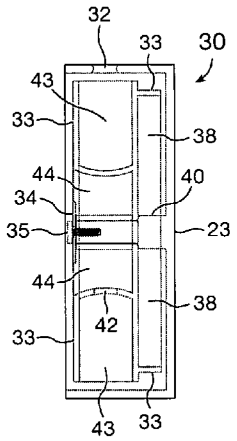
FIG. 2B is a left side view of the strap retractor mechanism without the strap, the rigid hook and the torsion spring shown showing the parts of the strap retractor mechanism assembled together.
Figure 2C:
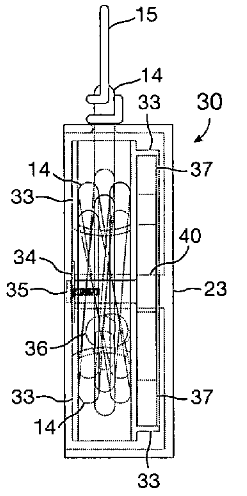
FIG. 2C is a left side view of the strap retractor mechanism with the strap, the rigid hook and the torsion spring shown showing the parts of the strap retractor mechanism assembled together.
Figure 2D:
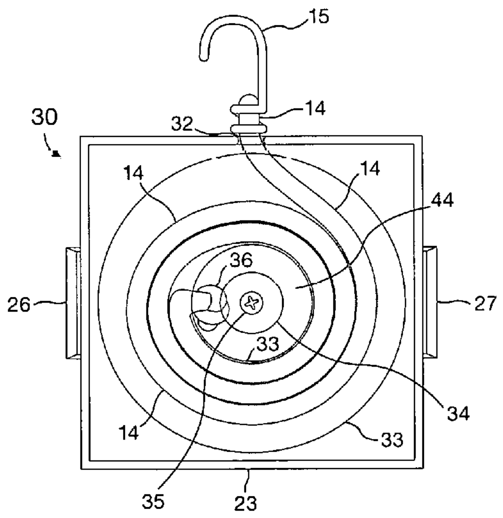
FIG. 2D is a front view of the strap retractor mechanism.
Figure 2E:
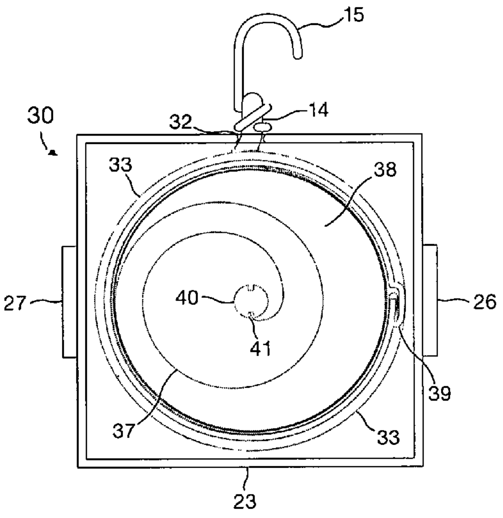
FIG. 2E is a back view of the strap retractor mechanism.

Referring to FIG. 1, the present invention consists of a trash can liner securing device 10. The trash can liner securing device 10 consists of a rigid trash receptacle 11, a strap retracting mechanism 30 and a pointed stake 16. The rigid trash receptacle 11 includes a bottom portion and at least one sidewall extending from the bottom portion. The sidewall includes an inner surface and an outer surface, with the receptacle formed within the inner surface of the sidewall. The sidewall further includes a protruding upper rim 22 forming an entrance leading into the rigid trash receptacle 11.

Referring to FIGS. 2A, 2B, 2C, 2D, and 2E, one embodiment of the strap retractor mechanism 30 is illustrated. The strap retractor mechanism 30 consists of a housing 23, a strap 14, a rigid hook 15, a retractor wheel 33, a torsion spring 37, a washer 34 and a screw 35. A pivot post 40 protrudes from the interior center of the housing 23 which the retractor wheel 33 slides over and sits on. Once the retractor wheel 33 and the housing 23 are engaged by way of the pivot post 40 the retractor wheel 33 is able to revolve around the pivot post 40 while secured inside the housing 23 by the washer 34 and the screw 35. A strap chamber 43 is molded into the retractor wheel 33 in order to accommodate the strap 14 which is spooled onto the retractor wheel 33. A knot chamber 44 is also molded into the retractor wheel 33 in order to accommodate a knot 36 which will be tied onto one end of the strap 14. A torsion spring chamber 38 is molded into the retractor wheel 33 in order to accommodate a torsion spring 37 which will keep the strap 14 spooled onto the retractor wheel 33 when it is disengaged and supply tension to the strap 14 when it is engaged. The outer end of the torsion spring 37 is bent 180 degrees in order to sit in a curved notch 39 on the sidewall of the torsion spring chamber 38 and the inner end of the torsion spring 37 is also bent 180 degrees in order to fit into a notch 41 in the torsion spring side of the pivot post 40. This enables the retractor wheel 33 to unwind in one direction providing tension to the strap 14 when it is engaged. When the strap 14 is disengaged the strap 14 rewinds back onto the retractor wheel 33. On the upper sidewall of the housing 23 is a strap hole 32 which is cut big enough to allow the strap 14, which is a little smaller than the strap hole 32, to be pulled through it. After the strap 14 is pulled through the strap hole 32 the rigid hook 15 is attached to that end of the strap 14 keeping the strap from pulling itself back through the strap hole 32. On the inner wall of the retractor wheel 33 between the strap chamber 43 and the knot chamber 44 is a knot hole 42 which is cut big enough to allow the strap 14, which is a little smaller than the retractor wheel hole 42, to be pulled through and knotted keeping that end of the strap 14 from pulling itself through the knot hole 42. On the left and right sidewalls of the housing 23 are protruding buttons 26, 27 which are there to attach and lock the strap retractor mechanism 30 into the rigid trash receptacle 11.

Figure 3:
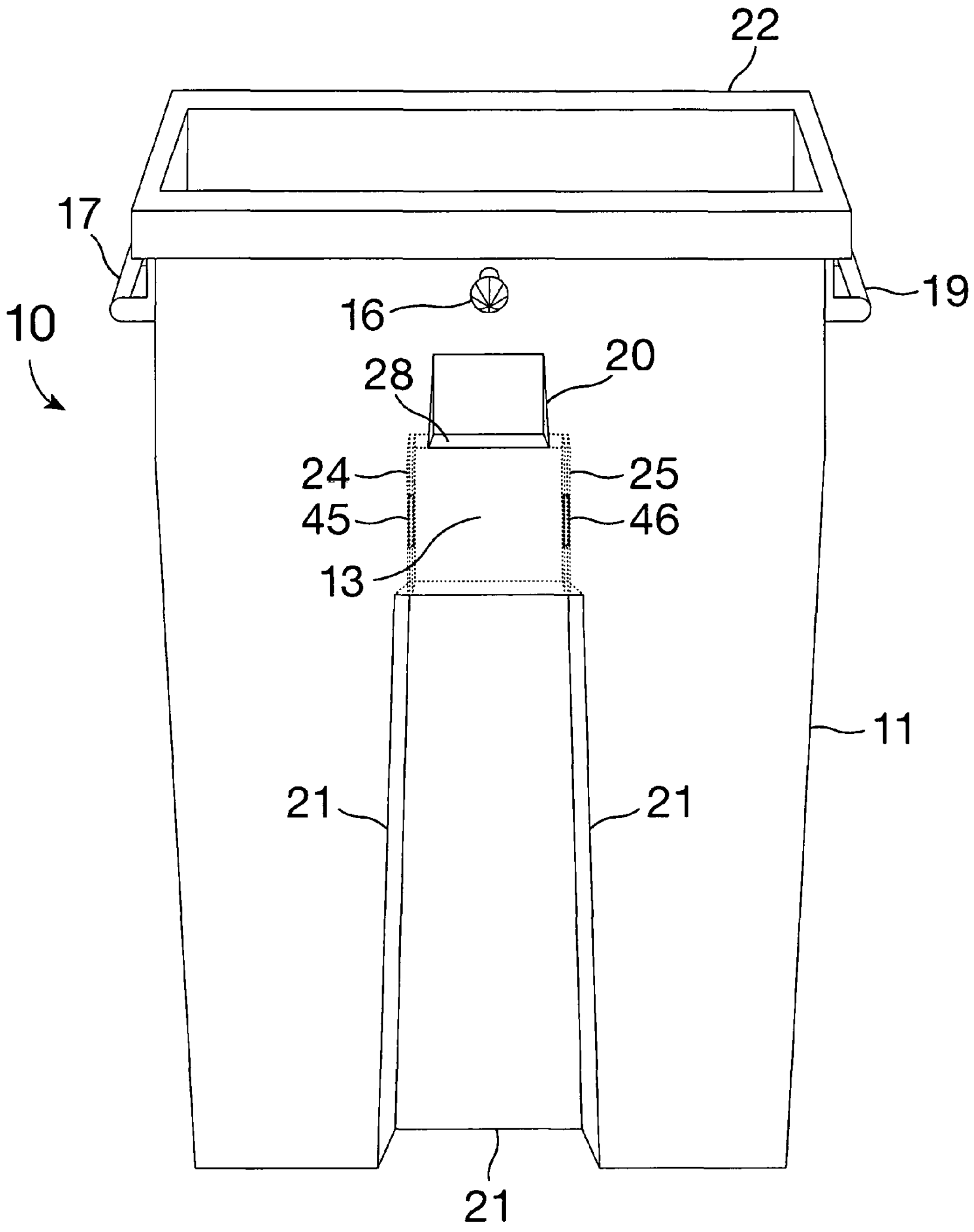
FIG. 3 is a perspective front view of the rigid trash receptacle without the strap retractor mechanism installed.

Referring to FIG. 3, the rigid trash receptacle 11 consists of a pointed stake 16, handles 17, 18, 19, a recessed area 20 to allow for an opening in the side of the rigid trash receptacle 28 between the outside and the inside of the rigid trash receptacle 11, an opening in the side of the rigid trash receptacle 28 to allow for the strap 14 to pass from the inside of the trash can to the outside, a fluted area 21 to allow for the trash can to be stacked, two sidewall protrusions 24, 25 with protrusion holes 45, 46 in each of them which sit on both sides of the strap retractor mechanism cavity 13, and the protruding upper rim 22 forming a reinforced entrance leading into the rigid trash receptacle 11.

Figure 4:
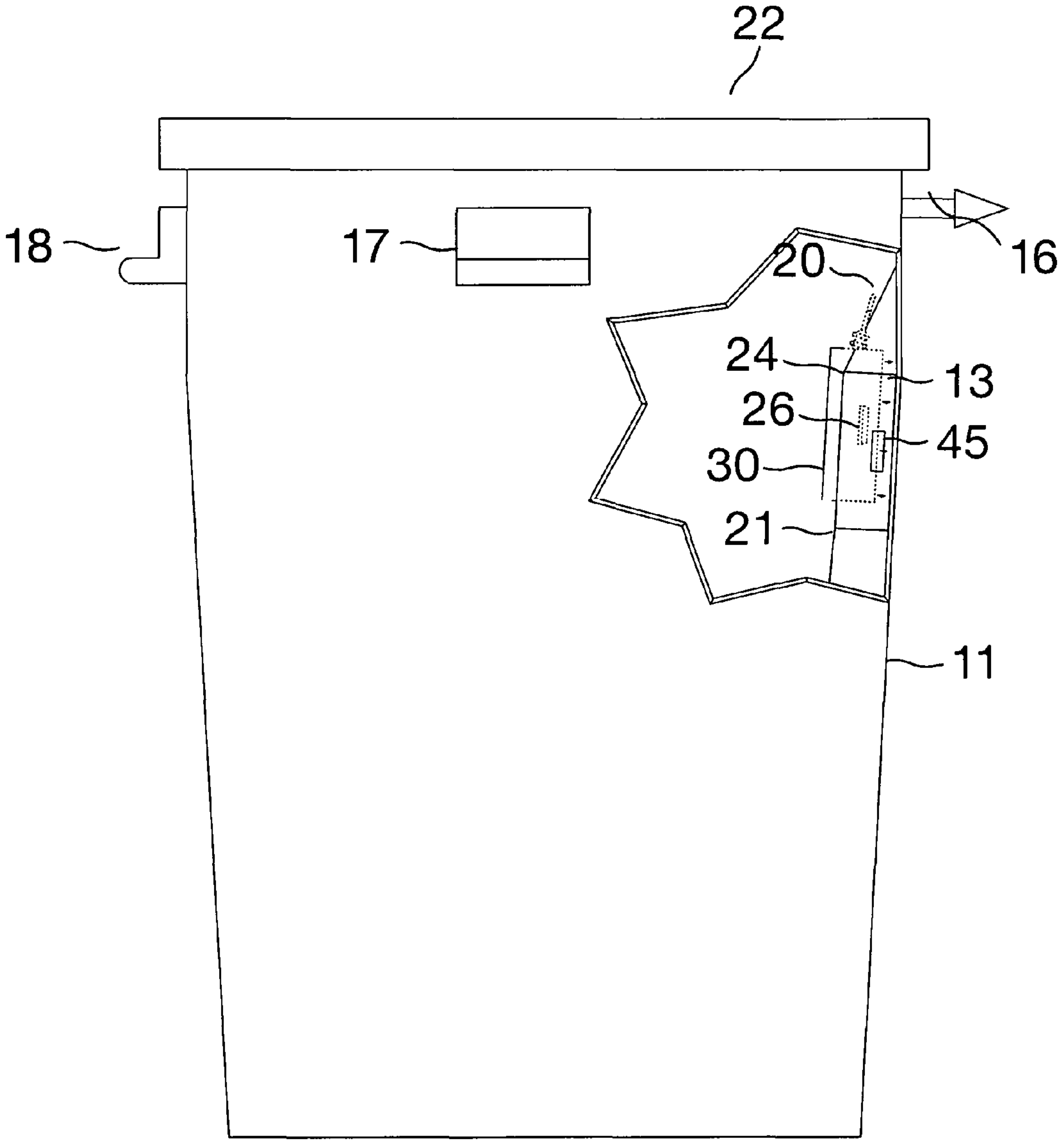
FIG. 4 is a cutaway side view of the rigid trash receptacle showing how the strap retractor mechanism fits into the rigid trash receptacle.
Figure 5A:
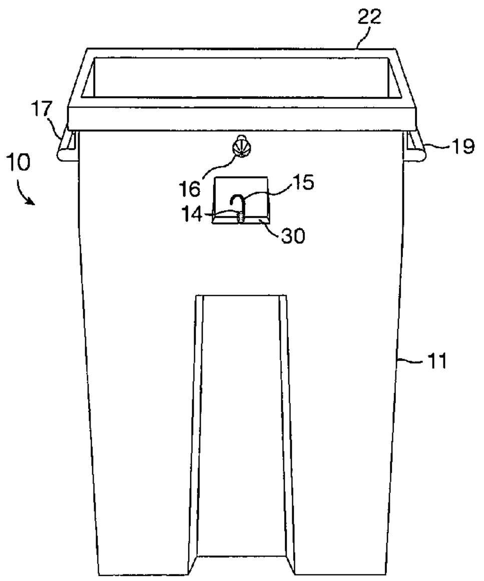
FIG. 5A is a perspective front view of the rigid trash receptacle with retractable strap without a trash can liner in it.
Figure 5B:
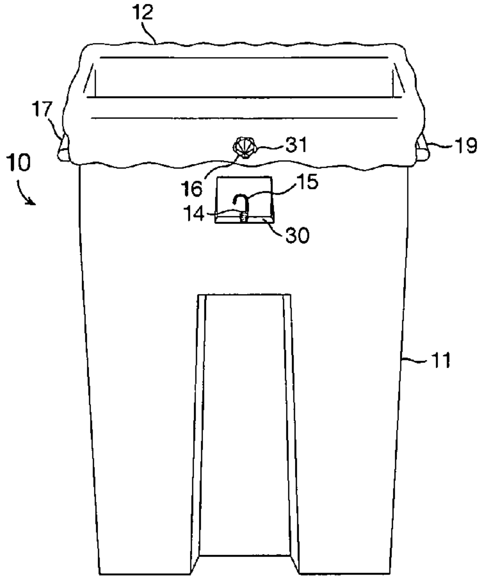
FIG. 5B is a perspective front view of the rigid trash receptacle with retractable strap with a trash can liner in it.
Figure 5C:
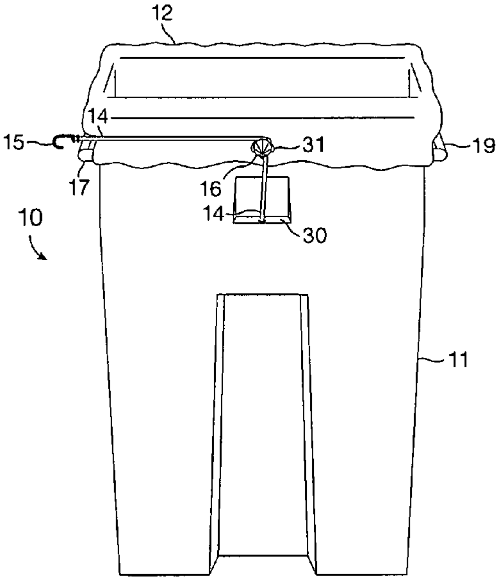
FIG. 5C is a perspective front view of the rigid trash receptacle with retractable strap with a trash can liner in it and the strap pulled over the pointed stake.
Figure 5D:
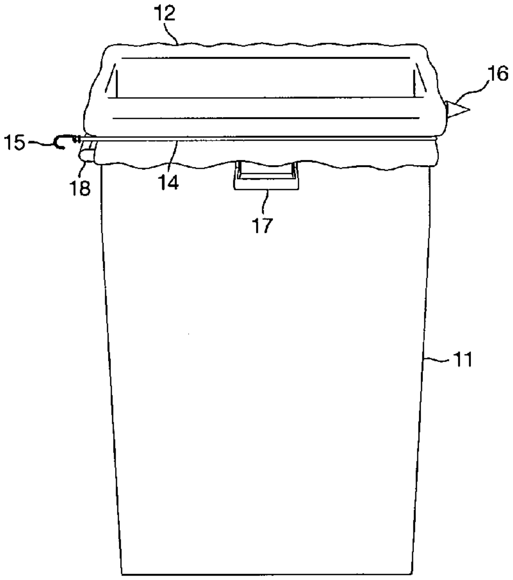
FIG. 5D is a perspective left side view of the rigid trash receptacle with retractable strap with a trash can liner in it and the strap pulled around the first corner of the rigid trash receptacle and between the upper rim and the handle of the rigid trash receptacle.
Figure 5E:
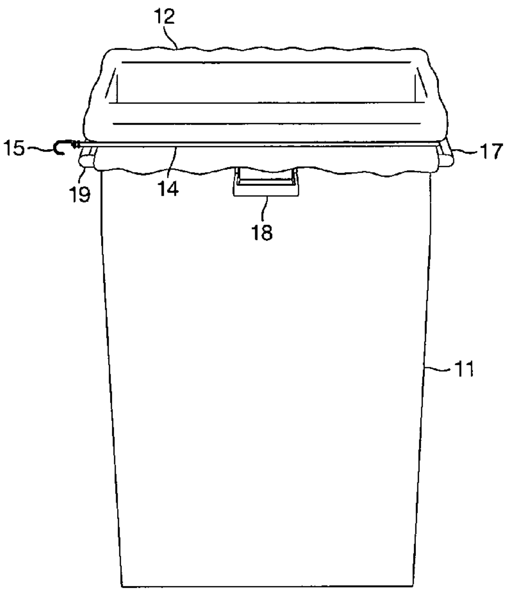
FIG. 5E is a perspective back view of the rigid trash receptacle with retractable strap with a trash can liner in it and the strap pulled around the second corner of the rigid trash receptacle and between the upper rim and the handle of the rigid trash receptacle.
Figure 5F:
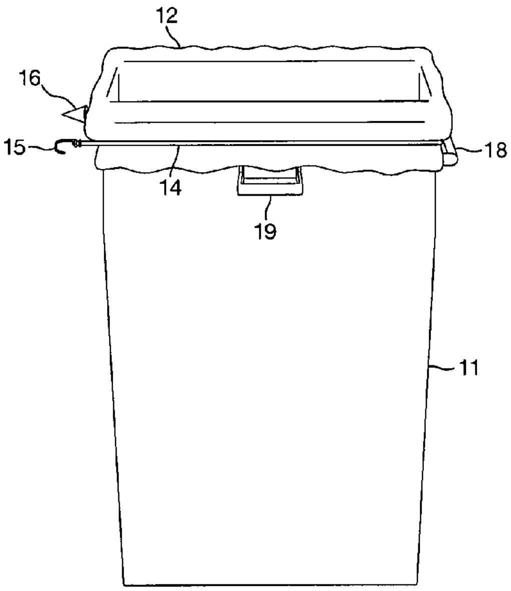
FIG. 5F is a perspective right side view of the rigid trash receptacle with retractable strap with a trash can liner in it and the strap pulled around the third corner of the rigid trash receptacle and between the upper rim and the handle of the rigid trash receptacle.
Figure 5G:
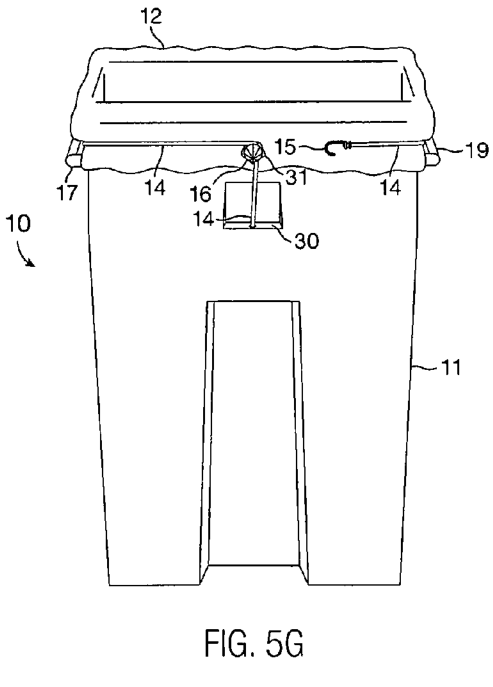
FIG. 5G is a perspective front view of the rigid trash receptacle with retractable strap with a trash can liner in it and the strap pulled around the last corner of the rigid trash receptacle.
Figure 5H:
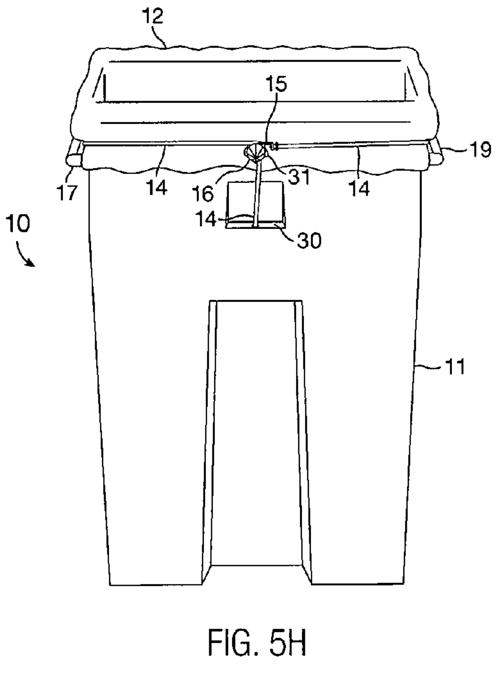
FIG. 5H is a perspective front view of the rigid trash receptacle with retractable strap with a trash can liner in it and the hook on the end of the strap hooked onto the pointed stake completing the engagement of the invention.

Referring to FIG. 4, a cutaway view for how the strap retractor mechanism 30 fits into the rigid trash receptacle 11. The strap retractor mechanism cavity 13 is sized to fit the strap retractor mechanism 30. The two protruding buttons 26 on both sides of the strap retractor mechanism 30 engage with the sidewall protrusion holes 45, 46 in both sides of the sidewall protrusions 24, 25 inside the rigid trash receptacle 11. Once the protruding buttons 26, 27 pass through the sidewall protrusion holes 45, 46 in the sidewall protrusions 24, 25 the strap retractor mechanism 30 remains firmly in place allowing for correct operation of the trash can liner securing device 10.

Referring to FIGS. 5A, 5B, 5C, 5D, 5E, 5F, 5G, and 5H, one embodiment of how the trash can liner securing device 10 operates is illustrated. A trash can liner 12 is placed inside the rigid trash receptacle 11 and folded over the protruding upper rim 22. The edge of the trash can liner 12 closest to the pointed stake 16 is pulled over the pointed stake 16 and punctured creating a puncture hole 31 in the trash can liner 12 enabling the pointed end of the pointed stake 16 to pass through the trash can liner 12. The trash can liner 12 can also come with a puncture hole 31 precut into the side of the trash can liner 12 so there is no need for the user to create a puncture hole 31 themselves. The trash can liner securing device 10 will also operate successfully if no puncture hole 31 is created and the trash can liner 12 sits on top of the pointed stake 16. The strap 14 with the rigid hook 15 on the end of it is then pulled in an upward direction and bent over the pointed stake 16 creating an approximate 90 degree angle with the strap 14. The strap 14 is then pulled 360 degrees around the upper portion of the rigid trash receptacle 11 in the channels created below the upper rim 22 and above the handles 17, 18, 19. The strap 14 with the rigid hook 15 on the end of it travels all the way around the upper portion of the rigid trash receptacle 11 and returns the pointed stake 16. The rigid hook 15 is then hooked onto the pointed stake 16 and the trash can liner device 10 is engaged keeping the trash can liner open and suspended in the rigid trash receptacle 11 allowing for unhindered filling of the trash can liner 12. When the user is done filling the trash can liner 12 the rigid hook 15 is unhooked from the pointed stake 16 and the strap 14 with the rigid hook 15 on the end of it is retracted back into the strap retractor mechanism 30 allowing for the trash can liner 12 to be easily pulled out of the rigid trash receptacle 11 and discarded.

It should be understood, of course, that the foregoing relates to exemplary embodiments of the invention and that modifications may be made without departing from the spirit and scope of the invention set forth in the following claims.

I claim:

1. A rigid trash receptacle with retractable strap for securing a trash can liner open inside a rigid trash receptacle comprising:

a rigid trash receptacle comprising at least one sidewall comprising an outer surface and an inner surface wherein a receptacle is formed within the inner surface, wherein at least one sidewall comprises an upper rim forming an entrance;

a strap having a first end attached to a rigid hook and the opposing end attached to a strap retractor mechanism;

a strap retractor mechanism configured to be secured to at least one sidewall of the rigid trash receptacle and arranged so a retractor wheel inside said strap retractor mechanism rotates about an axis enabling the strap attached to said strap retractor mechanism to extend away from said strap retractor mechanism with tension upon engagement and automatically retract back onto said retractor wheel inside said strap retractor mechanism upon disengagement; and a pointed stake attached or molded onto the outer surface of at least one sidewall of said rigid trash receptacle enabling the direction said strap is traveling to change by approximately 90 degrees when it is curved over said pointed stake allowing said rigid hook that is attached to said strap to be hooked onto said pointed stake after it has completed one revolution around said rigid trash receptacle and returned to said pointed stake pinning the part of said trash can liner that has been folded over said upper rim of said rigid trash receptacle to the outer surface of said rigid trash receptacle keeping the open end of said trash can liner continually open to receive trash.

2. The invention of claim 1 wherein the said opposing end of said strap is attached directly to said rigid trash receptacle.

3. The invention of claim 1 wherein said strap is made of an elastic material.

4. The invention of claim 1 wherein said strap is made of a non-elastic material.

5. The invention of claim 1 wherein said pointed stake is in the shape of a hook.

6. The invention of claim 1 wherein said pointed stake is reinforced with metal.

7. The invention of claim 1 wherein said strap retractor mechanism is secured to the rigid trash receptacle by an adhesive.

8. The invention of claim 1 wherein one sidewall of said rigid trash receptacle is fluted in such a way as to allow stacking of multiple said rigid trash receptacles with retractable straps for easy transport and distribution.

9. The invention of claim 1 wherein said rigid trash receptacle has wheels attached to the bottom of it.

10. The invention of claim 1 wherein said rigid hook is made of plastic.

11. The invention of claim 1 wherein said rigid hook is made of metal.

12. The invention of claim 1 wherein handles are attached or molded onto the outer surface of said rigid trash receptacle and said upper rim protrudes from said rigid trash receptacle.

13. The invention of claim 12 wherein said handles are made of plastic.

14. The invention of claim 12 wherein said handles are made of metal.

15. The invention of claim 12 wherein a channel to accommodate said strap is created between said attached or molded handles and said protruding upper rim of said rigid trash receptacle.

* * * * *